Oct. 9, 1962    HANS-GEORG FLACH ETAL    3,057,276
MULTI-SCALE LIGHT METER

Filed July 8, 1960    4 Sheets-Sheet 1

INVENTORS
HANS-GEORG FLACH
OTTO SANGER

By Toulmin & Toulmin
Attorneys

Oct. 9, 1962  HANS-GEORG FLACH ETAL  3,057,276
MULTI-SCALE LIGHT METER
Filed July 8, 1960  4 Sheets-Sheet 2

INVENTORS
HANS-GEORG FLACH
OTTO SANGER

By Toulmin & Toulmin
Attorneys

INVENTORS
HANS-GEORG FLACH
OTTO SANGER

By Toulmin & Toulmin
Attorneys 3,057,276
MULTI-SCALE LIGHT METER
Hans-Georg Flach and Otto Sänger, Wetzlar, Germany, assignors to Ernst Leitz G.m.b.H., Wetzlar (Lahn), Germany
Filed July 8, 1960, Ser. No. 41,632
Claims priority, application Germany July 23, 1959
5 Claims. (Cl. 95—10)

The present invention relates to a camera having an exposure meter, more particularly, to an exposure meter having a plurality of measuring ranges wherein the indication for the measured value is shown by a pointer which can register with a mark fixed on the camera case by rotational adjustment by the entire exposure meter mechanism.

It has been previously known to provide cameras with exposure meters having means for changing the measuring range by varying the intensity of the electric measuring current generated, e.g. by light-responsive photoelectric means. Exposure meters of this type can be provided with a plurality of indices or reading windows which are positioned in a staggered arrangement corresponding to the different degrees of sensitivity of the various measuring ranges.

Another proposed structure comprises a single indicating scale but having an indicator pointer having two pointer arms positioned at an angle with respect to each other which angle corresponds to the difference in sensitivity between two different measuring ranges.

The principal disadvantage of the above described arrangements is that either several or exceptionally large reading windows are required and accordingly these arrangements are not suitable for mounting in cameras where the movement of the pointer is to be visible in the view finder. A further disadvantage is that the presence of several indices, reading windows, or pointer arms lead to confusion in making readings.

The present invention overcomes the above disadvantages and provides for use of a plurality of measuring ranges in conjunction with a single stationary index and only one movable indicator pointer.

The present invention essentially comprises structure for either increasing or decreasing by a determined amount the current generated by the light-responsive means when effecting a change from one measuring range to another, and, in addition, to pivot the entire measuring mechanism to an angle which is equal but opposite in direction to the angle of the deflection of the pointer caused by the increase or decrease in the current generated by the light-responsive means. For example, if the angular deflection of the indicator pointer is $-\alpha°$ the entire measuring mechanism is pivoted through an angle of $+\alpha°$, thereby compensating the deflection of the pointer caused by the change of current intensity.

The entire measuring mechanism is detachably coupled with the setting or indicating means of a camera by means of a friction clutch. Therefore, after disengaging the clutch the pivoting movement of the measuring mechanism will not affect the setting or indicating means.

The angle through which the measuring mechanism is pivoted is somewhat smaller than the angle through which the pointer of the measuring mechanism is free to move. Therefore, if the sensitive measuring range is in operation, and the intensity of the light increases to such a degree that the pointer of the measuring mechanism reaches full deflection, the pointer cannot be returned to register with the stationary index mark while remaining within the sensitive measuring range when the mechanism is pivoted. The "sensitive" measuring range as referred to in the instant specification is used for measurements of low brightness or light intensity which range between the light values of 3–11; whereas the "non-sensitive" measuring range is used for measurements of relatively high light intensity and ranges between the values of 12–18.

When the scale of the sensitive measuring range is used and the pointer is at full scale deflection, movement of the housing and the entire measuring mechanism will not bring the pointer to register exactly with the fixed indicator mark: The pointer will stop a few degrees before the indicator mark. When this situation arises it is necessary to switch to the non-sensitive measuring range. When this switch has been made by rotating the scale disk together with the measuring mechanism with respect to the housing for the measuring mechanism, the pointer can be made to coincide with the stationary index mark because now the entire angle of the indicating scale or at least a portion thereof is available for reading. It is preferable to select the measuring ranges of the light meter in such a way that the values at the end of one range overlap by a predetermined amount with the initial values of the other measuring range.

It is therefore the principal object of this invention to provide a camera with an exposure meter having a plurality of measuring ranges but using only a single stationary index and only a single indicating pointer.

Other objects and advantages of this invention will become apparent upon reference to the accompanying description and taken in conjunction with the following drawings wherein.

Figure 1A:
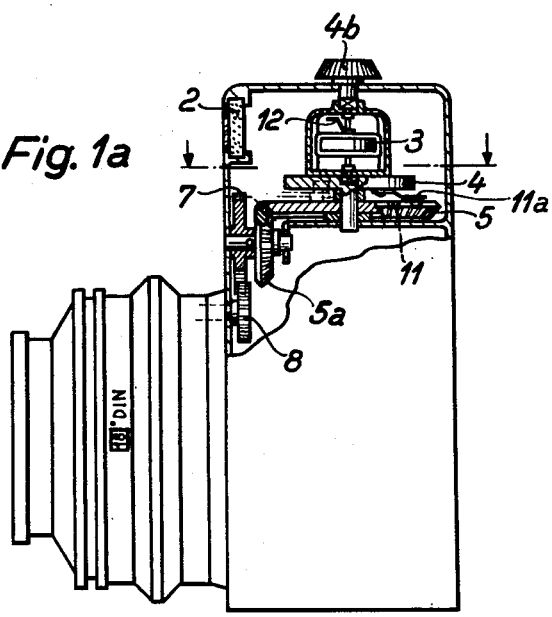
FIGURE 1a is a vertical sectional view of a camera provided with this invention and showing the manner in which the measuring mechanism is coupled with the setting means of the camera.
Figure 1B:
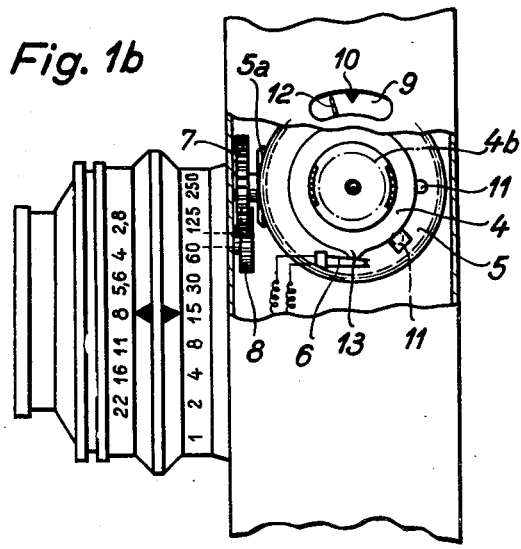
FIGURE 1b is a top plan view of the camera as shown in FIGURE 1a with a portion of the top wall removed to show the arrangement of the measuring mechanism within the camera.

Referring now to the drawings, more particularly to FIGURES 1a and 1b, a specific embodiment of this invention will be described.

In FIGURE 1a the camera is provided with light-responsive means which may be a photoelectric cell indicated at 2. The photoelectric cell is electrically connected to a measuring mechanism 3 which has a bottom 4 formed as a cam disk. The measuring mechanism is rotatably mounted on a bevel gear 5 which, in turn, is connected through a second bevel gear 5a and spur gears 7 and 8 with a differential gearing which is operatively connected with the time and diaphragm mechanism of the camera, in a well known structural arrangement not shown in the accompanying drawings for the sake of simplicity and clarity. This mechanism conventionally comprises adjusting rings mounted on the lens housing of the camera.

The shift from one particular measuring range to another measuring range, as, e.g., from a sensitive to a non-sensitive measuring range or vice versa, is brought about by a relative displacement between the measuring mechanism 3 and the bevel gear 5. This displacement is caused by manual actuation of the knob 4b which projects above the top wall of the camera. A cam 13 on the mechanism bottom 4 actuates the movable contact of a switch 6 which is mounted on the bevel wheel 5. A pair of notches or recesses 11 are provided in the surface of the bevel wheel 5 facing bottom 4, adapted to engage with a spring clip 11a mounted on the bottom 4. The engagement of the spring clip and one or the other of the two recesses 11 fix the measuring mechanism 3 and the bevel wheel 5 in one or the other of two relative positions of measuring mechanism and bevel gear.

In FIGURE 1b there is shown a reading window 9 in the top wall of the camera casing which has a stationary index 10 mounted therein. The indicating pointer 12 of the mechanism is disposed behind window 9. When adjusting the measuring mechanism the pointer 12 will be caused to register with the stationary index 10 by actuating the setting members of the camera.

Figure 2:
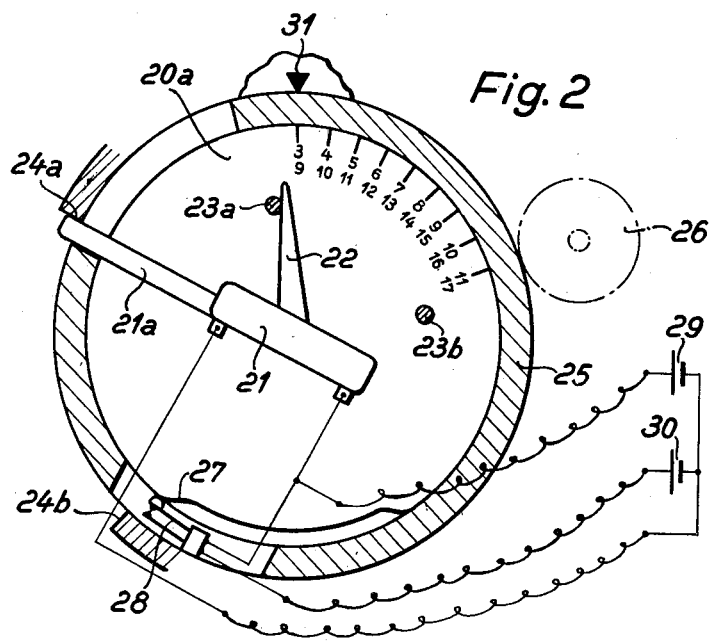
FIGURES 2, 3a, 3b, 4a and 4b are schematic views of the exposure meter showing several of the readings encountered during operation of this invention.

Proceeding next to FIGURE 2 there is indicated a scale disk 20a which has a measuring mechanism 21 fixedly mounted thereon. The scale disk is shown as positioned in the starting position of the more sensitive measuring range. There is a pointer 22 extending from the measuring mechanism and the pointer is in engagement with a left-hand stationary stop 23a. There is an arm 21a extending from the measuring mechanism for engagement with either a stationary stop 24a or with a stationary stop 24b mounted outwardly of the measuring mechanism. The scale disk 20a and the measuring mechanism 21 carried thereby are pivotally mounted within a housing 25. Elements 20a, 21 and 21a have two operating positions with respect to housing 25; in FIGS. 2, 3a, 3b and 4a these elements are in one of these operating positions, while they are shown in the other operating position in FIG. 4b. The angle α (see FIG. 4b) defines the angular difference between these operating positions relative to housing 25. The housing 25 is detachably coupled with the scale disk 20a by a spring clip, corresponding to spring clip 11a in FIG. 1a, so that rotation of the housing 25 by means of a knob corresponding to knob 4b in FIG. 1a will also bring about a rotation or pivotal movement of the scale disk 20a. In addition, the housing 25 has gear teeth thereon which are in constant engagement with the gear 26 which is drivingly connected with the adjusting members of the camera for shutter speed and diaphragm opening through a differential gearing which is not shown.

A control cam 27 is positioned on the periphery of the scale disk 20a for engagement with a movable contact arm of a contact 28 which is fixedly mounted on the housing 25. In the position as shown in FIGURE 2 the contact 28 is closed and as a result the current generated from the two parallel light-responsive elements 29 and 30 is led into the measuring mechanism 21.

Figure 3A:
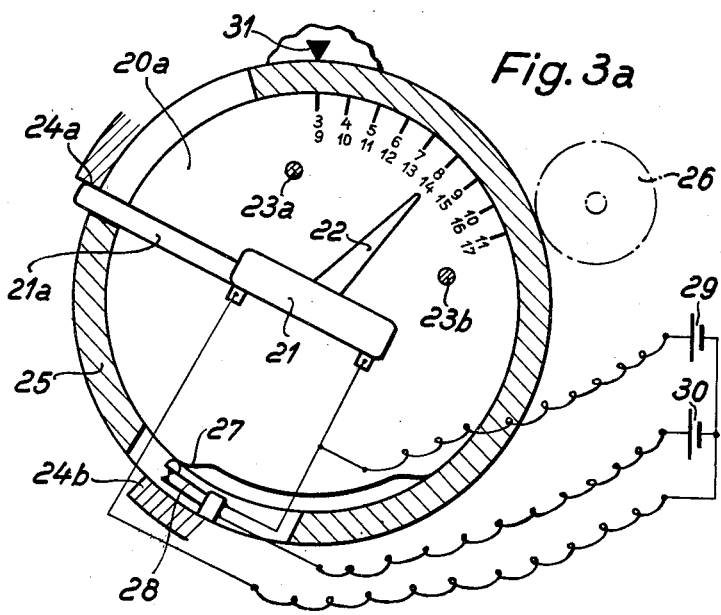
Figure 3B:
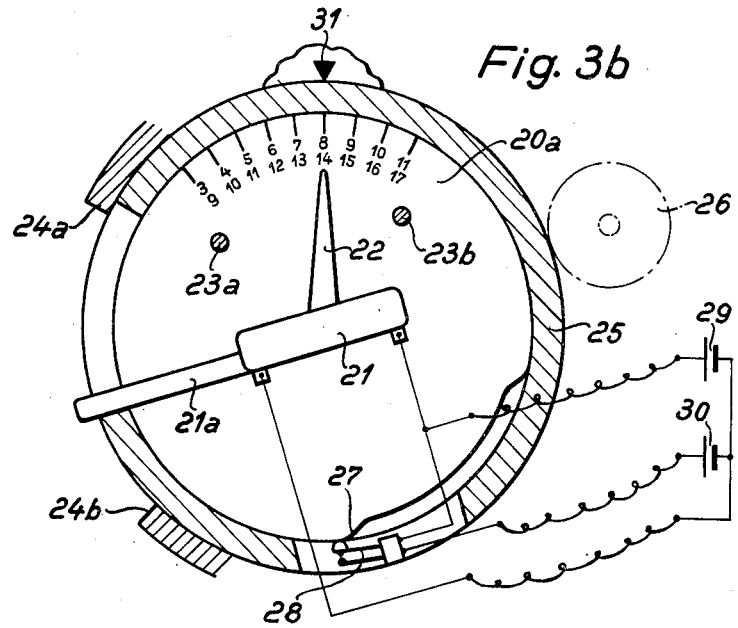

In FIGURE 3a the pointer 22 is deflected giving a reading in the sensitive measuring range. The measuring mechanism can be rotated so that the pointer 22 coincides with a stationary index mark 31. This position is shown in FIGURE 3b of the drawings. Accordingly, this is a normal situation encountered when operating in the sensitive measuring range.

Figure 4A:
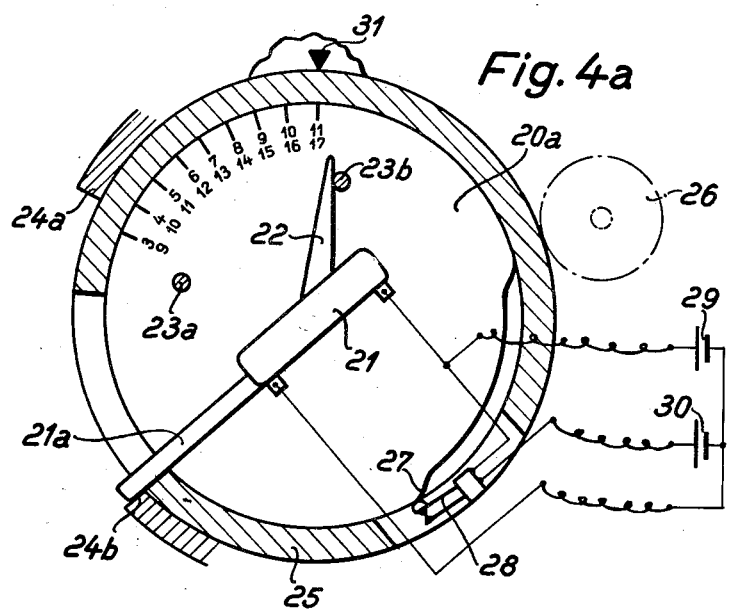

In FIGURE 4a, however, a reading is shown wherein the pointer 22 is deflected to an extreme position where it engages the right hand stop 23b. At this point a light meter reading of about 12 is obtained but this value is not shown on the scale in the sensitive measuring range. As can be further seen from FIGURE 4a the mechanism cannot be rotated to bring the pointer in registration with the stationary mark 31, since the arm 21a is in contact with a stationary abutment 24b. Accordingly, the measuring mechanism must be adjusted so that the non-sensitive measuring range is in the reading position.

Figure 4B:
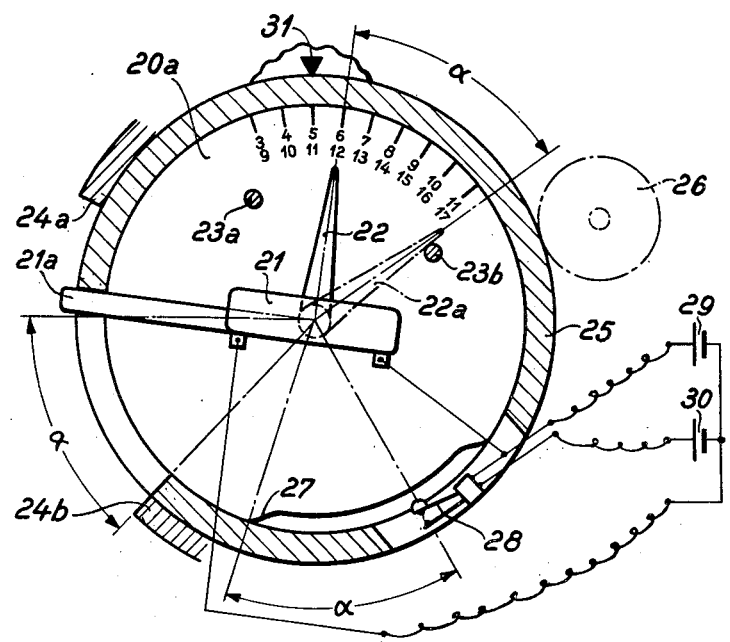

For changing the measuring range, the coupling between the scale disk 20a and housing 25 is disengaged and the scale disk 20a with measuring mechanism 21 and arm 21a is pivoted through the angle α by means of a knob corresponding to knob 4b in FIG. 1a, which pivoting is carried out while housing 25 remains in position. It has to be taken care of that arm 21a (with disk 20a and mechanism 21) is moved from one operating position relative to housing 25 to the other operating position and that pivoting is not stopped at an intermediate position. If the elements 20a, 21a and 21 would be placed in an intermediate position, the device would not operate properly. As the result of this adjustment, as can be seen in FIGURE 4b, the contact 28 is opened and, accordingly, the photoelectric cell 30 is disconnected. As the result, only the current of photoelectric cell 29 actuates the measuring mechanism 21. As can be seen in FIGURE 4b the dotted pointer 22a indicates the position the pointer would have assumed if the measuring mechanism 21 together with the scale disk 20a had been pivoted without an adjustment of the response of the light-responsive means 29 and 30.

The pointer 22 now indicates a light intensity of 12. The entire mechanism can be readily rotated so as to enable the pointer 22 to coincide with the index mark 31.

The rotation of the measuring mechanism will bring about an adjustment in the setting of the camera through the differential gearing of the camera, as above described. When the pointer 22 registers with the index mark 31 the setting of the camera will be correct for the light conditions encountered.

Other structures may be employed for decreasing the current which is fed to the measuring mechanism 21. This can be done by the positioning of a diaphragm before the photoelectric cells, by the use of electrical resistance in the circuits or by the use of a light filter.

It will become apparent, that for properly operating the device as outlined above, the only mark needed is index mark 31, the scales and other marks are helpful as indication for the light value but not essential for adjusting the camera. Independent from the point whether or not the operator-photographer knows which sensitivity range is present, his only operation is to bring pointer 22 in alignment with mark 31. If this is not possible, he has to change the range. It is apparent further, that if the pointer remains abutting stop 23b, the photographer knows, he is in the high-sensitivity range, and he has to decrease the sensitivity accordingly; if the pointer remains abutting or close to stop 23a but still to the left of mark 31 he knows, that the adjustment as present is very likely in the low-sensitivity range and he has to increase the sensitivity. In both cases he then knows how to adjust. There is one exception, and that is why the phrase "very likely" was used: Suppose in both ranges pointer 22 remains at stop 23a. Then there is too little light and no picture can be taken. In the scales given, the pointer will never abut stop 23b in both ranges, because no such brightness exists on earth causing pointer 22 to abut stop 23b in the low sensitivity range.

Under certain light conditions the pointer 22 will indicate a light intensity value which is contained in both of the measuring ranges; this is the case, for example, with respect to the value "10." After switching from one measuring range to the other measuring range in the aforedescribed manner, the entire measuring mechanism including the pointer now operates in that other measuring range. The pointer still points to the numeral "10," however, the numeral "10" belonging to the scale of that other measuring range. Since the measuring mechanism 21 has also been pivoted by actuating knob 4b by an angle equal in value to the angle of shift of the pointer, but in opposite direction, the pointer 22 is now again spaced from index 31 by the same distance as previously, i.e. prior to effecting the change of measuring ranges.

As the arm 21a has also been removed from stop 24b, the means for displacing the measuring mechanism 21 and disk 20, can again operate through at least part of the range of adjustment of mechanism 21 and disk 20.

As described previously the measuring mechanism 3 shown in FIGURES 1a and 1b is coupled with a setting means of a camera for varying the shutter speed and diaphragm opening through a differential gear system or to a rotatable disk of a manually actuated adjusting mechanism provided with the numerical values of time and opening. This coupling, however, is not affected by a pivoting movement of the measuring mechanism 3 with the concurrent changing of the indicating scale to the reading position since this pivoting movement requires only relative displacement between the measuring mechanism 3 and the bevel wheel 5. The two extreme positions of the displacement between the measuring mechanism can be secured by various means other than the spring clip and notch described herein.

It will also be understood that this invention is susceptible to modification in order to adapt it to different usages and conditions, and, accordingly, it is desired to comprehend such modifications within this invention as may fall within the scope of the appended claims.

What is claimed is:

1. In a camera, the combination of a pivotally mounted disk, a fixed indicator mark on said camera adjacent the periphery of said disk, measuring means mounted on said disk and having a deflectable pointer cooperating with said indicator mark, a rotatable member driven by the camera setting mechanism and releasably connected to said disk for common rotation, light-responsive means electrically connected to said measuring means; means for varying the sensitivity of said light-responsive means between two ranges, thereby deflecting said pointer; and means for turning said measuring means and said disk relative to said member by an angle equal to an angle corresponding to the difference in sensitivity of the two ranges of said light responsive means.

2. In a camera according to claim 1, said rotatable member comprising a housing rotatably mounted with respect to said indicator mark and supporting said disk.

3. A camera as claimed in claim 2 and further comprising clutch means interposed between said housing and the camera setting means so that said measuring means can be repositioned with respect to said setting means without affecting adjustment thereof.

4. In a camera having a housing for all of its components and including shutter speed and diaphragm setting devices, the combination: a member rotatable with respect to said housing; a measuring means having an angularly deflectable pointer, said measuring means being mounted for rotation selectively with or relative to said member; means rotatable with said member for arresting said measuring means in two positions displaced from each other by a given angle, a reference mark on said housing cooperating with said pointer; a first light responsive means electrically connected to said measuring means; a second light responsive means connected in parallel with said first light responsive means only when said measuring means is arrested in but one of said positions,, said light responsive means defining two sensitivity ranges the difference of which corresponds to an angle of deflection of said pointer equal to said given angle; and means coupling said member to said shutter speed and diaphragm setting devices.

5. In a camera as set forth in claim 1 said disk having two stop members for said pointer displaced from each other so that the pointer in either of said ranges may cover an angular range slightly larger than said angle corresponding to the difference in sensitivity of the two ranges, with one range being the high sensitivity range, the other one the low sensitivity range, one of said stop members preventing said pointer from covering all of the higher sensitivity range when said light responsive means is adjusted to low sensitivity, the other one of said stop members preventing said pointer from covering all of the lower sensitivity range when said light responsive means is adjusted to high sensitivity.

References Cited in the file of this patent

UNITED STATES PATENTS

| | | |
|---|---|---|
| 2,241,020 | Nerwin | May 6, 1941 |
| 2,250,898 | Tonnies | July 29, 1941 |
| 2,922,347 | Hahn | Jan. 26, 1960 |
| 2,926,562 | Bretthauer | Mar. 1, 1960 |
| 2,933,991 | Sauer | Apr. 26, 1960 |